No. 613,742. Patented Nov. 8, 1898.
F. R. VERNON.
RIBBON REEL.
(Application filed Aug. 4, 1898.)
(No Model.)

WITNESSES

INVENTOR

BY

ATTORNEYS

UNITED STATES PATENT OFFICE.

FREDERICK R. VERNON, OF NEW YORK, N. Y.

RIBBON-REEL.

SPECIFICATION forming part of Letters Patent No. 613,742, dated November 8, 1898.

Application filed August 4, 1898. Serial No. 687,691. (No model.)

*To all whom it may concern:*

Be it known that I, FREDERICK R. VERNON, a citizen of the United States, and a resident of New York, in the county of Kings and State of New York, have invented certain new and useful Improvements in Ribbon-Reels, of which the following is a specification.

Figure 1:
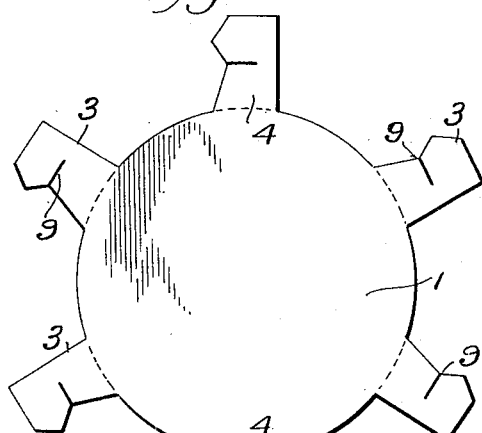
Figure 3:
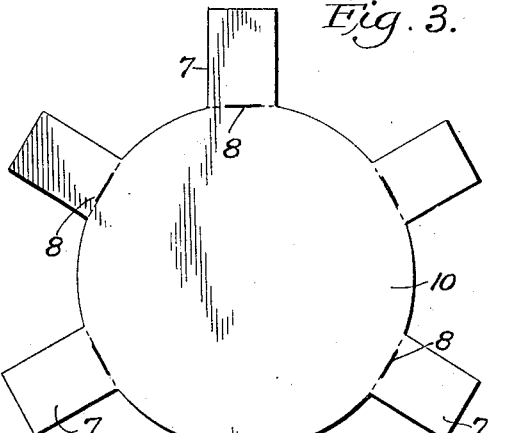
Figure 2:
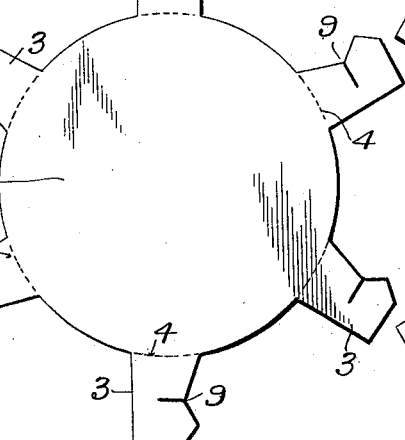
Figure 4:
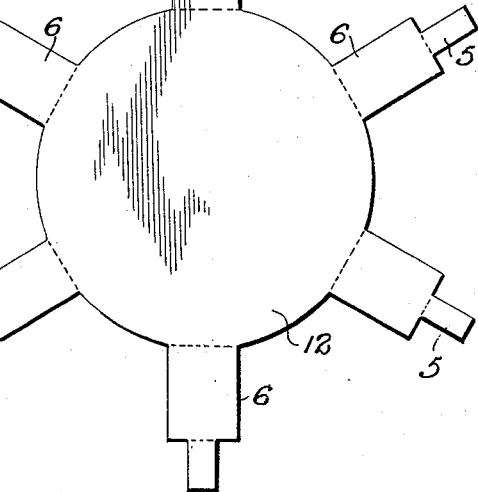
Figure 4:
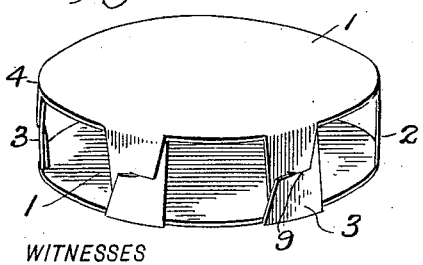
Figure 4:
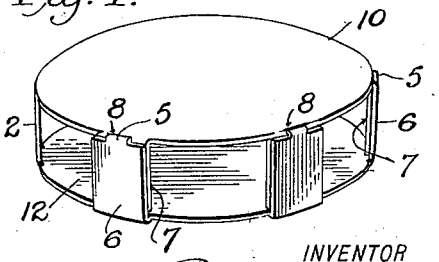

In the drawings, Figure 1 shows the blank. Fig. 2 shows the ribbon-reel ready for use. Fig. 3 shows a modification of the blank with a different fastening device. Fig. 4 shows the reel made from the blank shown in Fig. 3.

The object of my invention is to provide a ribbon-reel made of paper, which can be laid flat for transportation and quickly and easily folded into shape in the same manner as the well-known folding boxes.

The blank consists of two disks, which may be circular or of any desired shape. These disks are connected by a narrow strip 2, and each disk carries projecting from its periphery a series of tangs 3 of the shape shown, each of these tangs being slotted, as shown at 9. The shape of the interlocking devices is clearly shown in Fig. 1 and the method of putting them together clearly indicated in Fig. 2. In order to form the reel, two disks are raised, the creases shown by dotted lines at 4 allowing the motion. The parts 3 are then interlocked, as clearly shown in Fig. 2, and the ribbon-reel is complete.

Fig. 3 shows a modified form in which the locking device for the fastening devices consists of a tongue 5, projecting from the end of each tang 6 on one disk, while the opposite disk has at the line of juncture of the tang 7 with the disk a slot 8. In this form of the device the two disks are raised as before. The tang 7 is bent over until it projects at right angles to the surface of the disk. The tang 6 is then bent over and the tongue 5 inserted through the slot 8. The ribbon-reel is then complete, as shown in Fig. 4. I secure by this construction a very simple ribbon-reel, which can be quickly adjusted into shape and which will securely hold the parts in the required position.

It will be obvious that the two disks need not be permanently connected by the strip 2; but instead of said strip 2 each disk may have an additional tang with a locking device the same as the others, and the two disks will be united by joining all the tangs by means of their locking devices.

What I claim, and desire to secure by Letters Patent, is—

1. A folding ribbon-reel consisting of two disk-like pieces, the said disk-like pieces having tangs and means for causing said tangs to interlock, thus forming a finished reel, substantially as described.

2. A folding ribbon-reel consisting of two disk-like pieces, tangs projecting from the periphery of the said disk-like pieces and means for causing said tangs to interlock thus forming a finished reel, substantially as described.

3. A folding ribbon-reel consisting of two disk-like pieces, a single narrow strip connecting the same permanently, tangs projecting from the peripheries of the said disks and means for interlocking said tangs together, thus forming a finished reel, substantially as described.

Signed at New York, in the county of New York and State of New York, this 1st day of August, A. D. 1898.

FREDERICK R. VERNON.

Witnesses:
   E. M. HARMON,
   H. A. LEWIS.